United States Patent [19]
Naohara

[11] Patent Number: 5,896,353
[45] Date of Patent: Apr. 20, 1999

[54] SERVO CONTROL APPARATUS FOR CONTROLLING POSITION OF DEVICE

[75] Inventor: Shinichi Naohara, Tokorozawa, Japan

[73] Assignee: Pioneer Electronic Corporation, Tokyo-to, Japan

[21] Appl. No.: 08/905,044

[22] Filed: Aug. 1, 1997

[30] Foreign Application Priority Data

Aug. 2, 1996 [JP] Japan ............................ 8-205130

[51] Int. Cl.⁶ .................................................. G11B 7/09
[52] U.S. Cl. ................................ 369/44.25; 369/44.34; 369/44.28
[58] Field of Search ................. 369/44.26, 44.25, 369/44.27, 44.28, 44.29, 44.32, 44.34, 44.35, 44.36, 44.41, 32, 47, 59

[56] References Cited

U.S. PATENT DOCUMENTS

4,855,983  8/1989  Arai ................................ 369/44.34
5,590,103  12/1996  Noda ........................... 369/44.35 X

*Primary Examiner*—Muhammad N. Edun
*Attorney, Agent, or Firm*—Morgan, Lewis & Bockius LLP

[57] ABSTRACT

A position control apparatus 100 is provided with: an optical pickup 1 for reading information from a track formed on a optical disk DK by irradiating a light beam B to the track, detecting a quantity of a shift between a position of the light spot and a position of the track on the basis of the read information, and generating a tracking error signal; a sampling device 26 for sampling a low frequency component from the tracking error signal; an average calculating device 25 for calculating an average of an amplitude of the sampled low frequency component during a period of one rotation of the optical disk DK; a comparator 27 for comparing the calculated average with a predetermined value and generating a drive timing signal; a carriage driver 28 for generating a drive control signal on the basis of the drive timing signal; and a carriage servo motor 8 for moving the optical pickup 1 in a radial direction of the optical disk DK on the basis of the drive control signal.

9 Claims, 8 Drawing Sheets

000
SERVO CONTROL APPARATUS FOR CONTROLLING POSITION OF DEVICE

BACKGROUND OF THE INVENTION

1. Field of the Invention

The present invention generally relates to a position control apparatus for controlling a position of a device such as an optical pickup to be used for recording or reproducing a recording disk, for example, a CD (Compact Disk), an LD (Laser Disk) or the like.

2. Description of the Related Art

An optical recording system for recording information onto an optical recording disk such as a CD-R (Compact Disk-Recordable) or the like and an optical reproducing system for reproducing information recorded on an optical recording disk such as a CD, LD or the like are required to have various servo control mechanisms in order to accurately record the information onto the optical disk or to accurately read the information from the optical disk.

Here, as one example of the various servo control mechanisms, a servo control mechanism for controlling a position of an optical pickup in a CD reproducing system, which is the apparatus to reproduce a CD, will be explained.

The CD reproducing system has a spindle motor for controlling a rotation of the CD, a pickup for irradiating a light beam to a surface of the CD and detecting a reflective light from the surface of the CD in order to read information recorded on the CD, a signal processor for decoding the information read by the pickup in order to reproduce this information, a tracking servo motor for controlling a position of an objective lens disposed in the pickup, a carriage servo motor for controlling a position of the pickup, a detecting device for detecting a quantity of a shift (displacement) between a track position and a light spot position (irradiating position of the pickup) and generating a tracking error signal, whose amplitude changes in proportion to the aforementioned quantity of the shift, and a servo control driver for generating driving signals on the basis of the tracking error signal and applying these driving signals to the tracking servo motor and the carriage servo motor in order to drive and control these motors.

In operation, the spindle motor rotates the CD. Then, the pickup irradiates the light beam to a surface of the CD and detects the reflective light from the surface of the CD. In this manner, the pickup reads the information recorded on the CD and outputs an information signal corresponding to the read information to the signal processor and the detecting device respectively. Then, the signal processor decodes this information signal, so that the information signal is reproduced.

At this time, the detecting device detects the quantity of the shift between the track position and the light spot position on the basis of the information signal outputted from the pickup, and the detecting device generates a tracking error signal on the basis of the detected quantity of the shift. Here, a three beam method or a heterodyne method is used in the detection of the quantity of the shift. Then, the detecting device outputs this tracking error signal to the servo control driver.

The servo control driver is connected with each of the tracking servo motor and the carriage servo motor. The servo control driver generates driving signals on the basis of the tracking error signal outputted from the detecting device in order to drive and control each of these motors, and the servo control driver respectively outputs these driving signals to these motors. Thus, these motors is independently driven and controlled by these driving signals.

The tracking servo motor controls the position of the objective lens disposed in the pickup on the basis of the driving signal outputted from the servo control driver. Therefore, the objective lens is moved in the radial direction of the CD by the tracking servo motor. More specifically, the light beam irradiated toward the CD from the pickup is condensed by the objective lens, and thus, a light spot is formed on the surface of the CD. Therefore, the light spot position is adjusted by the movement of the objective lens. Thus, the tracking servo motor controls the position of the objective lens such that the quantity of the shift between the track position and the light spot position is reduced in order to accurately irradiate the light beam onto each track formed on the surface of the CD through the objective lens and normally read the information recorded on the CD.

The carriage servo motor controls the position of the pickup on the basis of the driving signal outputted from the servo control driver. Therefore, the pickup is moved in the radial direction of the CD by the carriage servo motor. More specifically, the light spot position is adjusted by not only the position of the objective lens but also the position of the pickup itself. Namely, the light spot position is roughly adjusted by the movement of the pickup, and it is finely adjusted by the movement of the objective lens. Thus, the carriage servo motor controls the position of the pickup such that the light spot position is moved along the tracks arranged in spiral or coaxial on the surface of the CD in order to accurately irradiate the light beam onto each track and normally read the information recorded on each track.

In this manner, the tracking servo motor and the carriage servo motor are driven on the basis of the driving signal generated on the basis of the tracking error signal, and the tracking servo motor and the carriage servo motor control the position of the objective lens and the pickup. Therefore, the quantity of the shift between the track position and the light spot position can be reduced, and the light spot position can be moved along the track arranged in spiral or coaxial shape on the surface of the CD.

However, an eccentricity of the CD may happen in cause of an eccentricity of the tracks formed on the CD in advance or an eccentricity of the shaft of the spindle motor. Further, the eccentricity of the CD may happen when it is bad to mount the CD into a turn-table of the CD reproducing system. The eccentricity of the CD generates an eccentric noise in the tracking error signal outputted from the detection device, as shown in FIG. 9.

Figure 9:
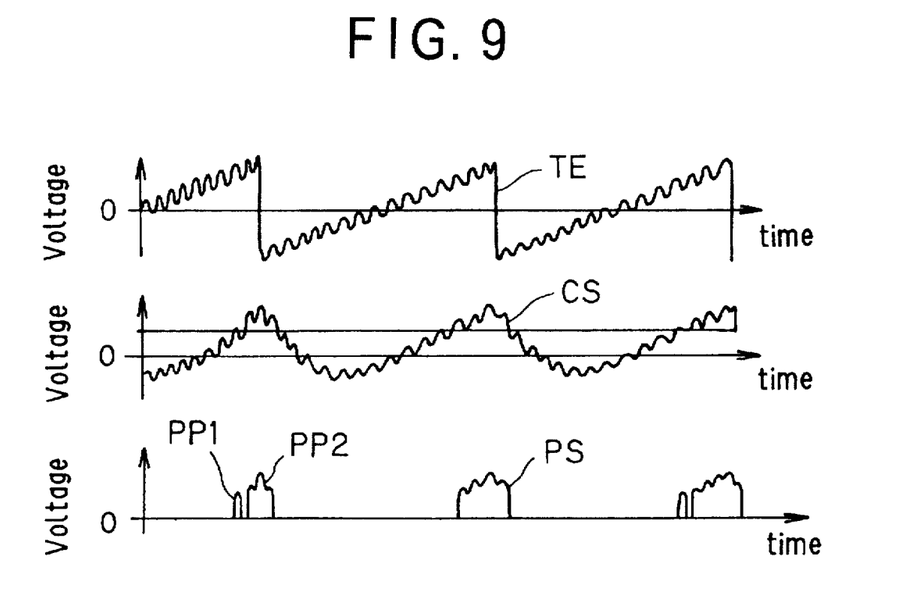
FIG. 9 is a wave form diagram showing wave forms of a tracking error signal, a converted signal and a pulse signal.

FIG. 9 shows the tracking error signal TE outputted from the detecting device, a converted signal CS, which is converted from the tracking error signal TE in the servo control driver, and a pulse signal PS generated from the converted signal CS in the servo control driver. The pulse signal PS is outputted to the carriage servo motor as the driving signal to drive the carriage servo motor. In FIG. 9, a high frequency sine curve is mixed in the tracking error signal TE. This high frequency sine curve is an eccentric noise generated in cause of the eccentricity of the CD. More specifically, if the eccentricity of the CD is happened, the actual track position is shifted out of the normal track position. In this case, the pickup and objective lens are respectively moved along the actual track position regardless the actual track position is shifted out of the normal track position. Therefore, when the detecting device generates the tracking error signal on the basis of the information signal outputted from the pickup, the high frequency sine curve is mixed into the tracking error signal as eccentric noise, as shown in FIG. 9.

Further, this eccentric noise is also mixed in the converted signal CS and the pulse signal PS. As a result, the carriage servo motor is controlled by the pulse signal PS mixed with the eccentric noise, and thus, the rotation of the carriage servo motor becomes unstable. Namely, the electric power in order to drive the carriage motor is obtained by the integration value of the pulse signal PS. Therefore, if the eccentric noise is mixed in the pulse signal PS, the integration value of the pulse signal PS is irregularly changed, so that the stable driving current cannot be applied to the carriage servo motor.

Furthermore, as shown in FIG. 9, the pulse signal PS is irregularly divided into the first pulse portion PP1 and the second pulse portion PP2. Therefore, if such irregularly divided pulse signals are applied to the carriage servo motor, the rotation of the carriage servo motor is unstable.

On the other hand, in order to solve the unstable of the carriage servo motor, the method that the aforementioned eccentric noise is cut off by using an equalizer may be proposed. However, it is difficult to efficiently solve the unstable of the carriage servo motor by this method as follows.

Namely, the aforementioned eccentric noise is generated by the eccentricity of the CD. Therefore, the frequency of the sine curve of the eccentric noise corresponds to the rotation number of the CD. The rotation of the CD is determined to about 200 [rpm] to 500 [rpm], so that the frequency of the eccentric noise is about 3 [Hz] to 8 [Hz].

Figure 10:
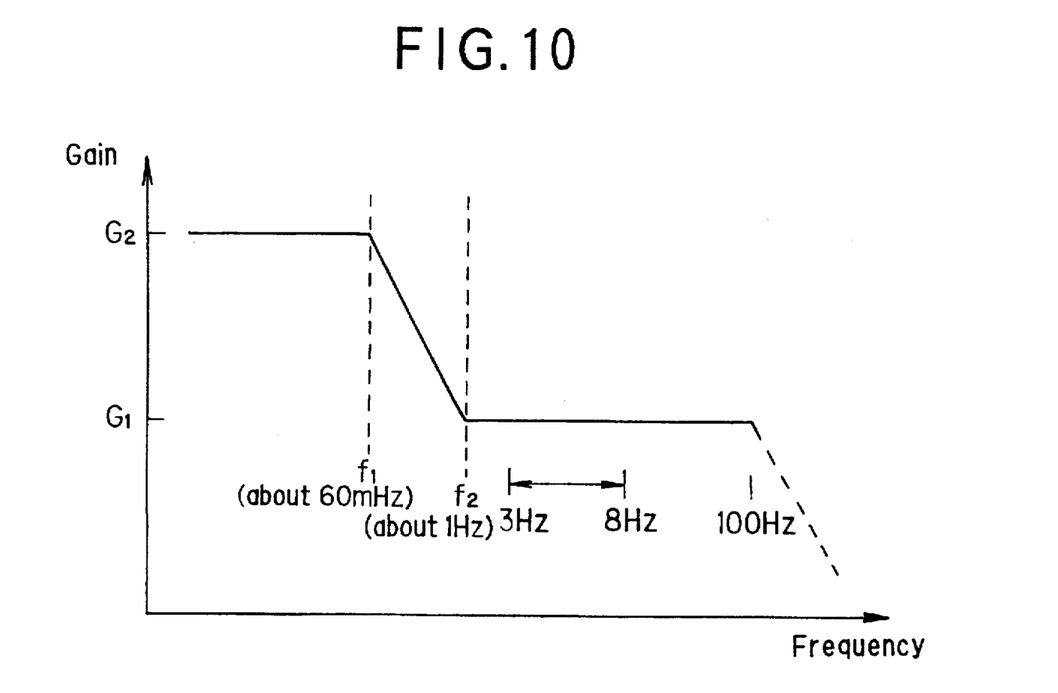
FIG. 10 is a graph showing a relation between a gain and a frequency concerning an equalizer used for lowering the gain in the frequency range of 3 [Hz] to 8 [Hz].

Thus, in order to lower the level of the eccentric noise whose frequency is in the range of about 3 [Hz] to 8 [Hz], an equalizer having the frequency characteristic as shown in FIG. 10 is needed. Namely, in order to remove the eccentric noise from the pulse signal PS, the equalizer must have the frequency characteristic based on the qualifications mentioned below.

(1) Obtaining the driving voltage to drive the carriage servo motor in a condition that the lens offset is about 60 [μm] in the direct current range, i.e., in the frequency range of not more than a frequency f1.

(2) Lowering a gain G1 in the range of the frequency f1 (about 60 [Hz]) to a frequency f2 (about 1 [Hz]) in order to remove the eccentric noise.

(3) Keeping the gain G1 more than predetermined level, in order to prevent an oscillation of the electric circuit of the carriage servo motor.

As mentioned above, the qualifications (2) and (3) are conflicted with each other. Because of the conflict between the qualifications (2) and (3), it is difficult to make the equalizer such that both of qualifications (2) and (3) can be sufficient. Further, in order to satisfy the qualification (3), the gain G1 cannot be drastically lowered. Therefore, the eccentric noise cannot be completely removed.

SUMMARY OF THE INVENTION

It is therefore an object of the present invention to provide a position control apparatus, in which the influence of the eccentric noise can be removed and the operation thereof can be in stable.

According to the present invention, the aforementioned object can be achieved by a position control apparatus having: a reading device reading information from a track formed on a recording medium shaped in a disk by irradiating a light beam to the track, and said reading device outputting the read information as an information signal; a first detecting device for detecting a quantity of a shift between a position of an irradiation of the light beam and a position of the track on the basis of the information signal outputted from the reading device and generating a shift quantity signal corresponding to the detected quantity of the shift; a sampling device for sampling a low frequency component from the generated shift quantity signal; a calculating device for calculating an average of an amplitude of the sampled low frequency component during a period of one rotation or N (N is a natural number) rotations of the recording medium; a comparing device for comparing the calculated average with a predetermined value and generating a drive timing signal corresponding to a difference between the calculated average and the predetermined value; a generating device for generating a drive control signal to be used for controlling a movement of the reading device on the basis of the generated drive timing signal; and a first driving device for moving the reading device in a radial direction of the recording medium on the basis of the generated drive control signal.

Thus, if the eccentric noise, which is generated by the eccentricity of the recording medium, is mixed into the information signal outputted from the reading device and the shift quantity signal generated by the first detecting device, the eccentric noise can be removed by the sampling device and the calculating device. Namely, the sampling device samples the low frequency component signal from the shift quantity signal. Therefore, the high frequency noise component can be removed. Further, the calculating device calculates the average of the amplitude of the low frequency component sampled by the sampling device during a period of one rotation or N rotations of the recording medium. Therefore, the eccentric noise is removed from the low frequency component. In this manner, according to the present invention, the eccentric noise can be removed from the drive control signal applied to the driving device. Thus, the control of the first driving device can be in stable, and the movement of the reading device can be in stable.

Further, the reading device has a condense device for condensing the light beam irradiated onto the track, a second driving device for moving the condense device in a radial direction of the recording medium, and a second detecting device for detecting a quantity of a movement of the condense device and outputting the quantity of the movement as information signal.

Therefore, since the quantity of a movement of the condense device is detected by the second detecting device, the quantity of the shift between the position of the irradiation of the light beam and the position of the track can be accurately detected. Thus, the stability of the control of the first driving device and the movement of the reading device can be improved.

Furthermore, the sampling device samples an amplitude of the low frequency component at a moment corresponding to each of a plurality of sampling points set on the recording medium in advance.

Therefore, the sampling device carries out sampling at only each of the sampling points, so that the number of times of the sampling operation by the sampling device can be reduced. Thus, the constructions of the sampling device and the calculating device can be simplified.

The nature, utility, and further feature of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Referring to the accompanying drawings, embodiments of the present invention will be now explained. In the following explanation, a position control apparatus of the present invention is adapted for a carriage and tracking servo control apparatus for control an optical pickup and an objective lens disposed in an optical reproducing system to reproduce an optical disk.

(1) THE FIRST EMBODIMENT OF THE PRESENT INVENTION

At first, the first embodiment of the present invention will be explained with reference to FIGS. 1 to 4.

Figure 1:
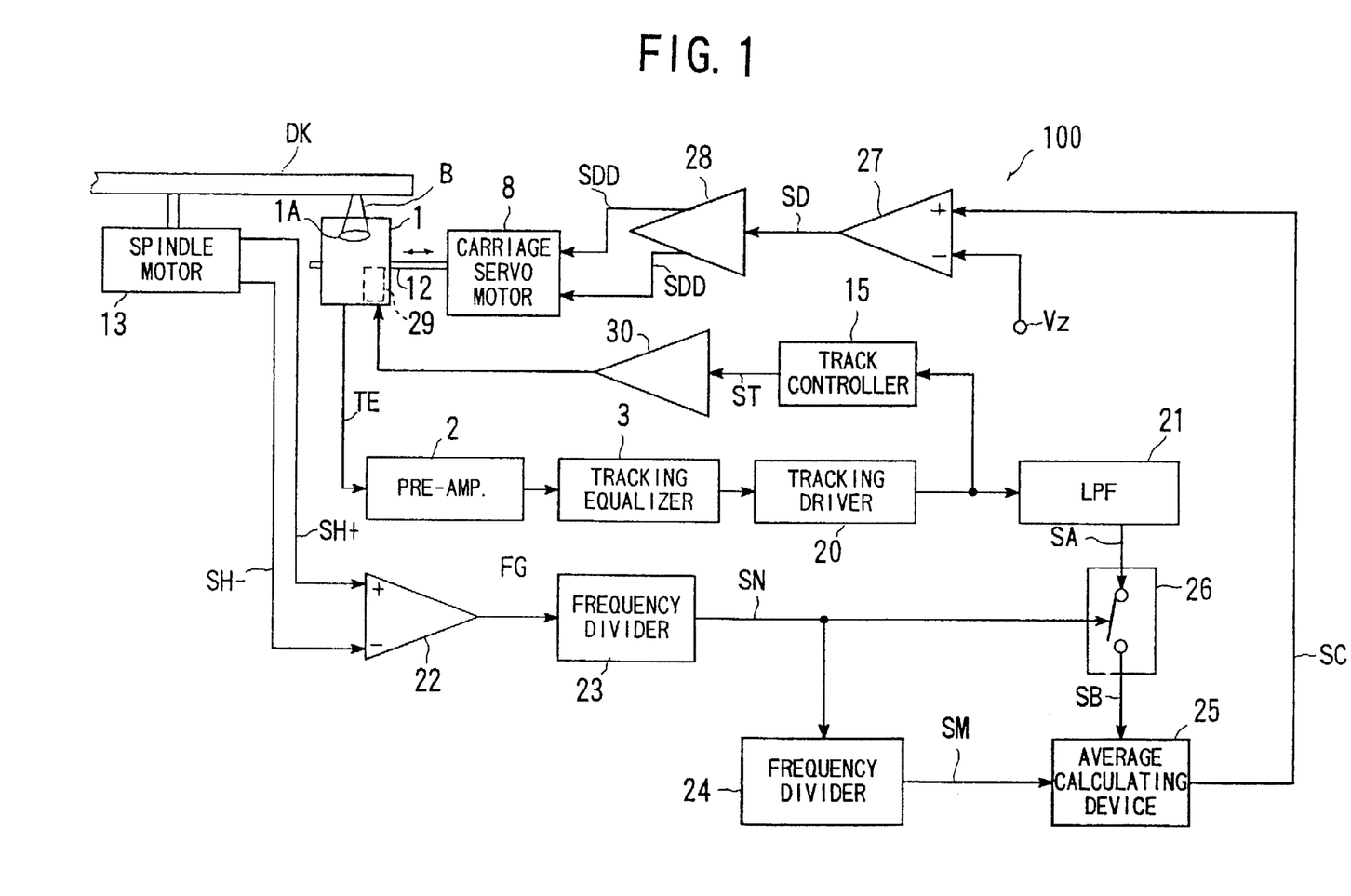
FIG. 1 is a block diagram of a carriage and tracking servo control apparatus of a first embodiment of the present invention.

In FIG. 1, a carriage and tracking servo control apparatus 100 of the optical reproducing system is provided with: an optical pickup 1, as one example of a reading device and a first detecting device, for reading the information recorded on an optical disk DK and generating a tracking error signal TE; a pre-amplifier 2 for amplifying the tracking error signal TE outputted from the pickup 1; a tracking equalizer 3 for compensating a phase of the tracking error signal TE; a carriage servo motor 8, as one example of a first driving device, for controlling the position of the pickup 1; a shaft 12 for connecting the carriage servo motor 8 with the pickup 1; a spindle motor 13 for controlling a rotation of the optical disk DK; a tracking driver 20 for amplifying the tracking error signal TE; a LPF (Low Pass Filter) 21 for filtering the tracking error signal TE and outputting a low frequency component signal SA; a first comparator 22 for generating a frequency generation signal FG; a first frequency divider 23 for frequency dividing the frequency generation signal FG and outputting a first divided signal SN; a second frequency divider 24 for frequency dividing the first divided signal SN and outputting a second divided signal SM; an average calculating device 25 for generating an average of the second divided signal SM and outputting the average signal SC, a sampling device 26 for sampling the low frequency component signal SA and outputting a sampled signal SB; a second comparator 27 for comparing the average signal SC with a reference signal Vz and outputting a driving timing signal SD; a carriage driver 28 for generating a drive signals SDD to driving the carriage motor 8; a tracking servo motor 29 (one example of a second driving device) disposed in the pickup 1 for controlling the position of an objective lens 1A (one example of a condense device) disposed in the pickup 1; a track controller 15 for generating a tracking driving signal ST; and a track control driver 30 for amplifying the tracking driving signal ST and applying the amplified tracking driving signal ST to the tracking servo motor 29.

In operation, the spindle motor 13 rotates the optical disk DK. Then, the pickup 1 irradiates the light beam B to the surface of the optical disk DK, and thus, a light spot is formed at the position of the irradiation by the light beam B on the surface of the optical disk DK. Then, the pickup 1 detects the reflective light from the surface of the optical disk DK. In this manner, the pickup 1 reads the information recorded on the optical disk DK.

Here, the optical disk DK is the recording medium shaped into a disk. On the surface of the optical disk DK, a plurality of tracks are formed, and these tracks are arranged in a spiral or coaxial manner on the surface of the optical disk DK. In these tracks, the various information are recorded. For instance, the information includes reproducing information for reproducing the sound, music, picture, movie, etc..

The pickup 1 reads the reproducing information and outputs this reproducing information as an information signal. Then, the information signal outputted from the pickup 1 is decoded by a signal processor (not shown in figures) and reproduced.

Further, pickup 1 detects the quantity of the shift (displacement) between a track position and a light spot position (a position of an irradiation of the light beam B) by using a three beam method, a heterodyne method or the like. Then, the pickup 1 generates the tracking error signal TE (shift quantity signal), whose amplitude changes in proportion to the quantity of the shift (displacement) between the track position and the light spot position. Then, the pickup 1 outputs the tracking error signal TE to the pre-amplifier 2.

The pre-amplifier 2 amplifies the tracking error signal TE, and the tracking equalizer 3 compensates the phase of the amplified tracking error signal TE. Further, the tracking driver 20 is amplifies the compensated tracking error signal TE by the predetermined gain. Thereafter, the tracking error signal TE is respectively outputted to the track controller 15 and the LPF 21.

The track controller 15 generates the tracking driving signal ST on the basis of the tracking error signal TE and outputs the tracking driving signal ST to the track control driver 30. The track control driver 30 amplifies the tracking driving signal ST and outputs the amplified tracking driving signal ST to the tracking servo motor 29. The tracking servo motor 29 rotates on the basis of the amplified tracking driving signal ST and controls theposition of the objective lens 1A in the radial direction of the optical disk DK. Therefore, the light spot position is finely controlled by the movement of the objective lens 1A.

Figure 2:
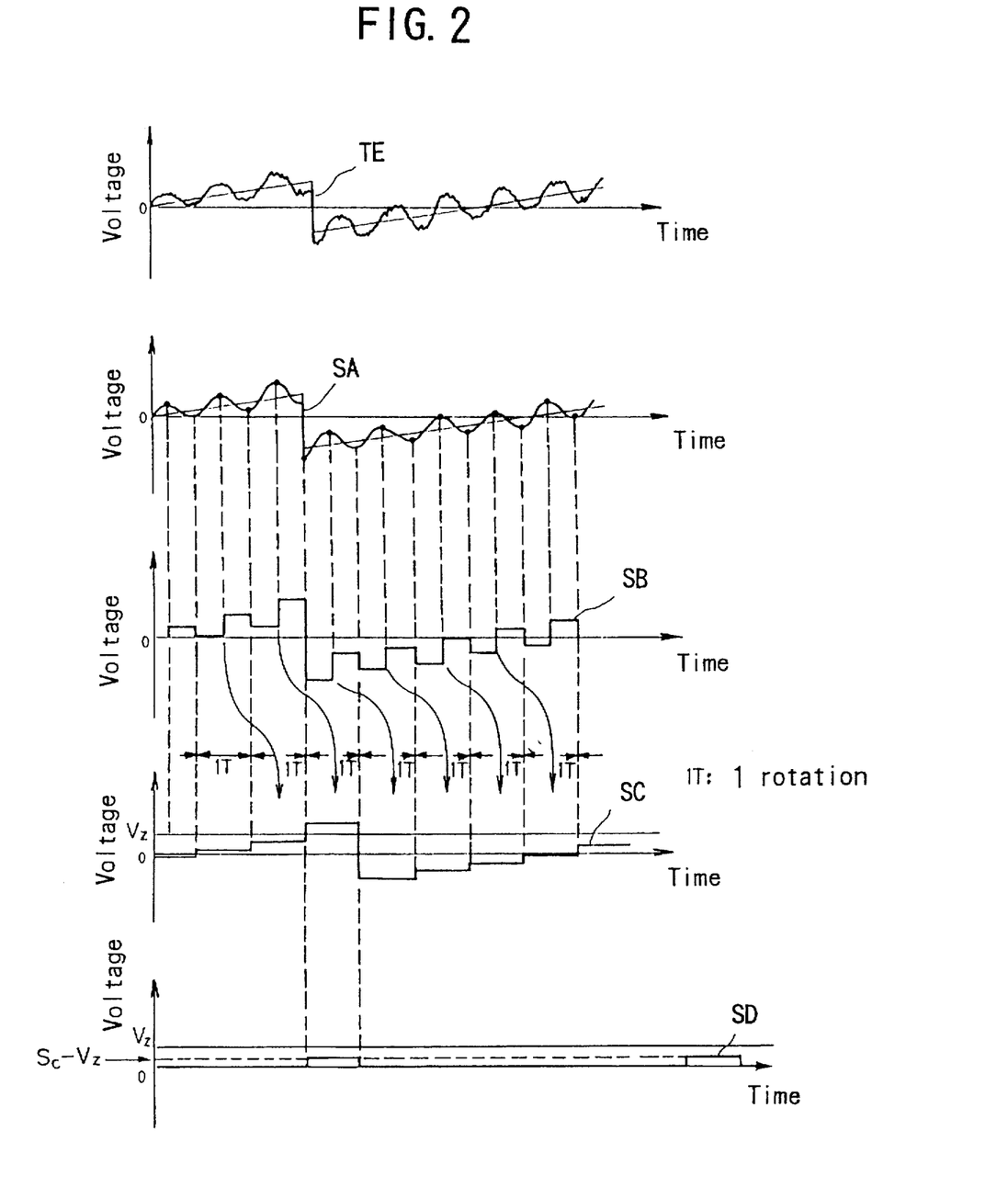
FIG. 2 is a wave form diagram showing wave forms of a tracking error signal, a low frequency component signal, a sampling signal, an average signal and a driving timing signal in the first embodiment.

Here, one example of the tracking error signal TE outputted from the tracking driver 20 is shown in FIG. 2. In this tracking error signal TE, a high frequency noise NH, that looks like a relatively high frequency sine wave, and a low frequency noise NL, that looks like a relatively low frequency sine wave, are mixed. The high frequency noise NH is generated in the causes of the movement of the objective lens 1A in the radial direction of the optical disk DK by the tracking servo control in order to move the light spot position along each track. The low frequency noise NL is generated in the cause of the eccentricity of the optical disk DK. Namely, if the track position is shifted because of the eccentricity of the optical disk DK, the objective lens 1A is controlled by the tracking servo control such that the light spot follows each shifted track when the optical disk DK is rotating in a condition that a rotation axis of the optical disk DK is shifted. Therefore, the low frequency noise NL is mixed in the tracking error signal TE as shown in FIG. 2. In addition, since this low frequency noise NL is generated in the cause of the eccentricity of the optical disk DK, the oscillatory cycle of the low frequency noise NL corresponds to the rotation cycle of the optical disk DK.

Further, in FIG. 2, the amplitude of the tracking error signal TE periodically and slowly increases. This is the reason why the objective lens 1A is moved toward the outer circumference side of the optical disk DK such that the light spot follows each track.

Furthermore, in FIG. 2, the discontinuous portions in the tracking error signal TE are in the cause of the movement of the pickup 1 itself. Namely, when the quantity of the movement of the objective lens 1A exceeds the limitation of the moving range thereof, the light spot cannot follow each track by only the movement of the objective lens 1A. Therefore, the pickup 1 is moved in the radial direction of the optical disk DK by the carriage servo motor 8.

Next, the LPF 21 cuts off the high frequency noise NH from the tracking error signal TE outputted from the tracking driver 20, as shown in FIG. 2. Namely, the LPF 21 extracts the low frequency component from the tracking error signal TE and outputs it to the sampling device 26. For instance, in case that the optical disk DK is a CD, the center frequency fc in the LPF 21 is 8.83 [Hz] (530 [rpm]/60) at the inner circumference and 3.33 [Hz] (200 [rpm]/60) at the outer circumference. Further, in case that the four times velocity type CD-ROM (CD-Read Only Memory), which is capable of reading information while the CD-ROM is rotated in the four times velocity as fast as that of a normal CD, the center frequency fc in the LPF 21 is 35.3 [Hz] (2120 [rpm]/60) at the inner circumference and 13.3 [Hz] (800 [rpm]/60) at the outer circumference.

On the other hand, while the aforementioned operation is being performed, the spindle motor 13 outputs a positive Hall element signal SH+ and a negative Hall element signal SH− to the first comparator 22. Here, Hall elements are disposed in the spindle motor 13, each of the Hall elements detects the rotation velocity of the spindle motor 13 and outputs the positive Hall element signal SH+ and the negative Hall element signal SH−. More specifically, the Hall element is an element having a characteristic that impedance thereof is changed in correspondence with a magnetic field. Therefore, the impedance of each of the Hall elements is changed in correspondence with the change of the magnetic field in cause of the change of the rotation velocity of the spindle motor 13. Therefore, the change of the rotation velocity of the spindle motor 13 can be obtained as the positive Hall element signal SH+ and the negative Hall element signal SH−. Here, the Hall element is one example of a third detecting device.

The first comparator 22 compares the positive Hall element signal SH+ and the negative Hall element signal SH− and outputs the difference between the both of the signals SH+ and SH− to the first frequency divider 23 as a frequency generator signal FG. The frequency generator signal FG is the pulse signal corresponding to the rotation velocity of the spindle motor 13. More specifically, the frequency generator signal FG is the pulse signal having 36 pulse for each one rotation of the optical disk DK. Then, the first frequency divider 23 divides the frequency of the frequency generator signal FG into 1/n and outputs the first dividing signal SN to the sampling device 26. Therefore, the frequency of the first divided signal SN is the same as the sampling frequency of the sampling device 26.

In the sampling device 26, the low frequency component signal SA and the first divided signal SN are inputted. The sampling device 26 samples the low frequency component signal SA by the sampling frequency corresponding to the frequency of the divided signal SN and outputs the sampling signal SB, as shown in FIG. 2.

Figure 3:
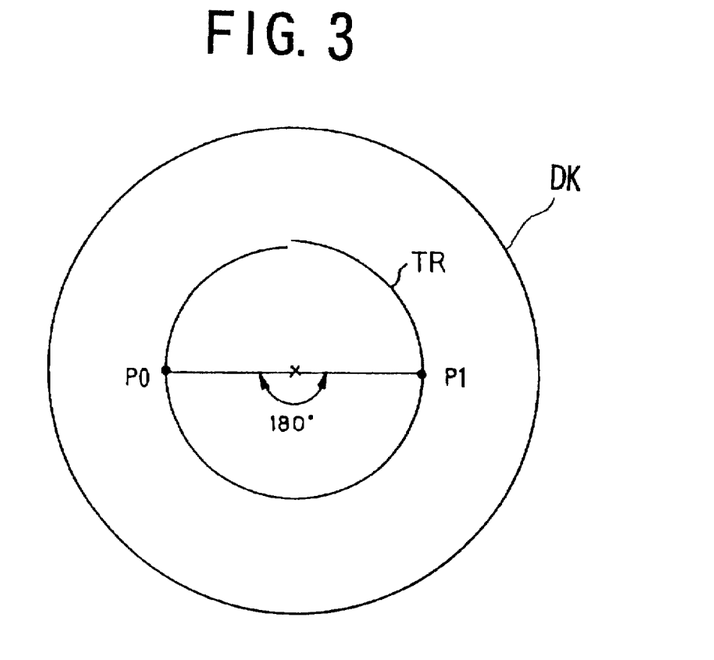
FIG. 3 is a diagram showing an optical disk, on which two sampling points are disposed.

Here, the sampling frequency of the sampling device 26 is determined by the condition explained below. Namely, in case that two sampling points P0 and P1 are disposed on the optical disk DK at the opposite sides of the center portion of the optical disk DK, as shown in FIG. 3, the sampling frequency of the sampling device 26 is determined to the two times as high as the rotation number per one second of the optical disk DK. In this case, the first frequency divider 23 divides the frequency of the frequency generator signal FG into the 2 times frequency as high as the rotation number per one second of the optical disk DK. In this case, the sampling device 26 samples the peak level at the moment of each of the sampling points P0 and P1 and holds this peak level during the half cycle of the rotation of the optical disk DK.

Figure 4:
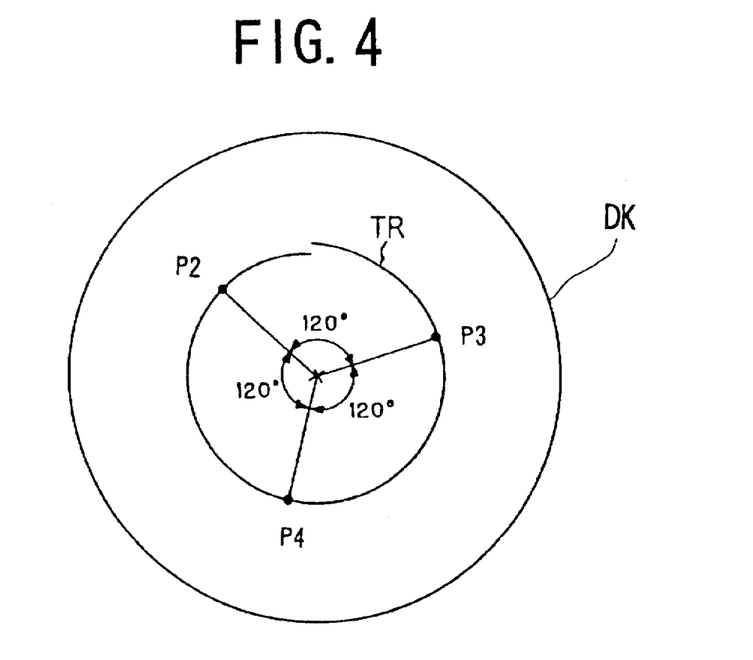
FIG. 4 is a diagram showing an optical disk, on which three sampling points are disposed.

In addition, the number of the sampling points are not restricted to two. Namely, more than two sampling points may be disposed on the optical disk DK. In these cases, each of the sampling points is disposed such that the distance in the circumference direction between the sampling points adjacent to each other is uniform. FIG. 4 shows three sampling points P2, P3 and P4 disposed on the optical disk DK. Further, each of the sampling points P2, P3 and P4 is disposed at the place where the line connected between each of the sampling points P2, P3 and P4 with the center of the optical disk DK and a track formed of the optical disk DK are crossed each other, as shown in FIG. 3.

The sampling signal SB outputted from the sampling device 26 is inputted to the average calculating device 25. At this time, the second divided signal SM is inputted to the average calculating device 25. The second divided signal SM is generated by the second frequency divider 24. Namely, the second frequency divider 24 further divides the frequency of the first divided signal SN into 1/m and outputs the second divided signal SM to the average calculating device 25. The frequency of the second divided signal SM is the same as the rotation number per one second of the optical disk DK.

Here, examples of the dividing ratio of the first frequency divider 23 and the second frequency divider 24 are described below. In case that the frequency generator signal FG has 36 pulses for each one rotation of the optical disk DK, the two sampling point are disposed on the optical disk DK as shown in FIG. 3, and the average of the sampling signal SB in the period of the one rotation of the optical disk DK is calculated by the average calculating device 25, the first frequency divider 23 divides the frequency of the frequency generator signal FG into 1/18, and the second frequency divider 24 divides the frequency of the first divided signal SN into 1/2. On the other hand, in case that the k (k is a natural number) sampling point are disposed on the optical disk DK, the first frequency divider 23 divides the frequency of the frequency generator signal FG into k/36, and the second frequency divider 24 divides the frequency of the first divided signal SN into 1/k. On the other hand, in case that the frequency generator signal FG has 36 pulses for each one rotation of the optical disk DK, the k sampling point are disposed on the optical disk DK, and the average of the sampling signal SB in the period of the two rotations of the optical disk DK is calculated by the average calculating device 25, the first frequency divider 23 divides the frequency of the frequency generator signal FG into 36/k, and the second frequency divider 24 divides the frequency of the first divided signal SN into 1/(2k).

Next, the average calculating device 25 generates the average of the sampling signal SB under a timing control on the basis of the second divided signal SM and outputs the average signal SC to the second comparator 27. Namely, the average calculating device 25 generates the average of the amplitude of the sampling signal SB during the period of the one rotation of the optical disk DK. In this manner, since the average calculating device 25 generates the average for each of one rotation of the optical disk DK, the influence of the eccentricity of the optical disk DK can be removed. Namely, as shown in FIG. 2, the low frequency noise NL is removed from the average signal SC. In addition, the average calculating device 25 generates the average signal SC based on the sampling signal SB during the period of one rotation before the preset rotation by one cycle.

Next, the second comparator 27 compares the average signal SC with the reference signal Vz set in advance and outputs the driving timing signal SD to the carriage driver 28. Namely, the driving timing signal SD becomes high level when the voltage of the average signal SC exceeds the voltage of the reference signal Vz. When the driving timing signal SD becomes high level, the carriage servo motor 8 is driven. In addition, the voltage of the reference signal Vz is decided on the basis of the moving range of the objective lens 1A of the pickup 1 and the output level of the average signal SC, as shown in FIG. 2.

The carriage driver 28 generates the drive signal SDD in order to drive the carriage motor 8 by the driving timing signal SD. Therefore, the carriage servo motor 8 is driven by the drive signal SDD, and the shaft 12 is rotated, then, the pickup 1 is moved in the radial direction of the optical disk DK. At this time, the drive signal SDD does not include the eccentric noise (low frequency noise NL) because this noise is already removed by the average calculating device 25.

As mentioned above, according to the carriage and tracking servo control apparatus 100 of the first embodiment, the low frequency component signal SA is generated from the tracking error signal TE in the LPF 21, and the low frequency component signal is sampled at the times corresponding to the predetermined sampling points, and thus, the sampling signal SB is generated. Then, the average of the sampling signal SB by one rotation of the optical disk DK, i.e., the average signal SC is generated, and the drive signal SDD in order to drive the carriage motor 8 is generated on the basis of the average signal SC. Therefore, the eccentric noise, which is generated by the eccentricity of the optical disk DK, is removed from the drive signal SDD. Thus, the control of the carriage servo motor 8 can be in stable, and the control of the position of the pickup 1 can be in stable.

Further, the sampling device 26 samples the low frequency component signal SA at the two sampling point P0 and P1, and the average calculating device 25 generates the average of the sampling signal SB for each one rotation of the optical disk DK. Namely, according to the carriage and tracking servo control apparatus 100, the number of sampling points is not many, and thus, the operation for generating the average is very simple, so that the construction of the carriage and tracking servo control apparatus 100 can be simplified.

(2) THE SECOND EMBODIMENT OF THE PRESENT INVENTION

Figure 5:
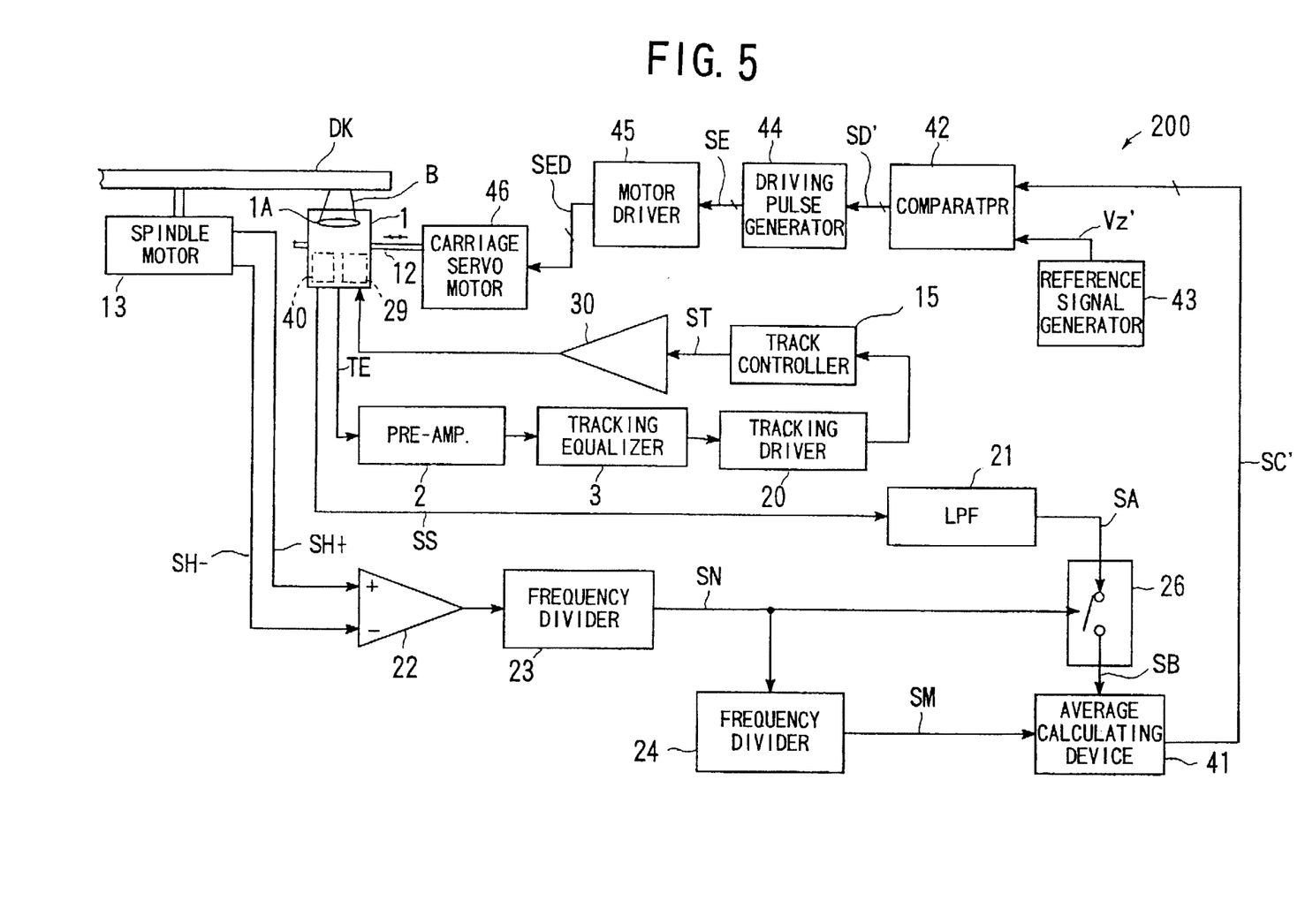
FIG. 5 is a block diagram of a carriage and tracking servo control apparatus of a second embodiment of the present invention.

Next, the second embodiment of the present invention will be explained with reference to FIGS. 5 to 8. In FIG. 5, same constructional elements as those in FIG. 1 carry the same reference numbers and the explanations thereof are omitted. The differences between this embodiment and the aforementioned first embodiment are that a carriage and tracking servo control apparatus of the this embodiment has a lens shift sensor as one example of a second detecting device, which directly detects the movement (shift) of the objective lens, the average signal SC' obtained on the basis of a shift quantity signal outputted from the lens shift sensor is a digital signal, and the carriage servo control is carried out by using a stepping motor controlled by the digital signal.

Namely, as shown in FIG. 5, a carriage and tracking servo control apparatus 200 has: a lens shift sensor 40 for directly detecting the movement (shift) of the objective lens 1A; an average calculating device 41 for generating an average of the second divided signal SM and outputting the average signal SC'; a second comparator 42 for comparing the average signal SC' with a reference signal Vz' and outputting a driving timing signal SD'; a reference signal generator 43 for generating the reference signal Vz'; a driving pulse generator 44 for generating a driving pulse SE, a motor driver 45 for driving a stepping motor 46; and the stepping motor 46 for controlling the position of the pickup 1 as carriage servo motor.

The carriage and tracking servo control apparatus 200 of the second embodiment further has the pickup 1, the pre-amplifier 2, the tracking equalizer 3, the spindle motor 13, the tracking driver 20, the first comparator 22, the first frequency divider 23, the second frequency divider 24, the sampling device 26, etc.. The construction of each element is the same as that of one included in the carriage and tracking servo control apparatus 100 of the first embodiment. However, in the carriage and tracking servo control apparatus 200 of the second embodiment, the lens shift sensor 40 is directly connected with the LPF 21, and the pre-amplifier 2, tracking equalizer 3 and tracking driver 20 are not in relation to the carriage servo control directly.

In operation, the lens shift sensor 40 disposed in the pickup 1 detects the movement of the objective lens 1A in the radial direction of the optical disk DK when information recorded on the optical disk DK is reproduced, and the lens shift sensor 40 outputs a shift quantity signal SS to the LPF 21.

Figure 6:
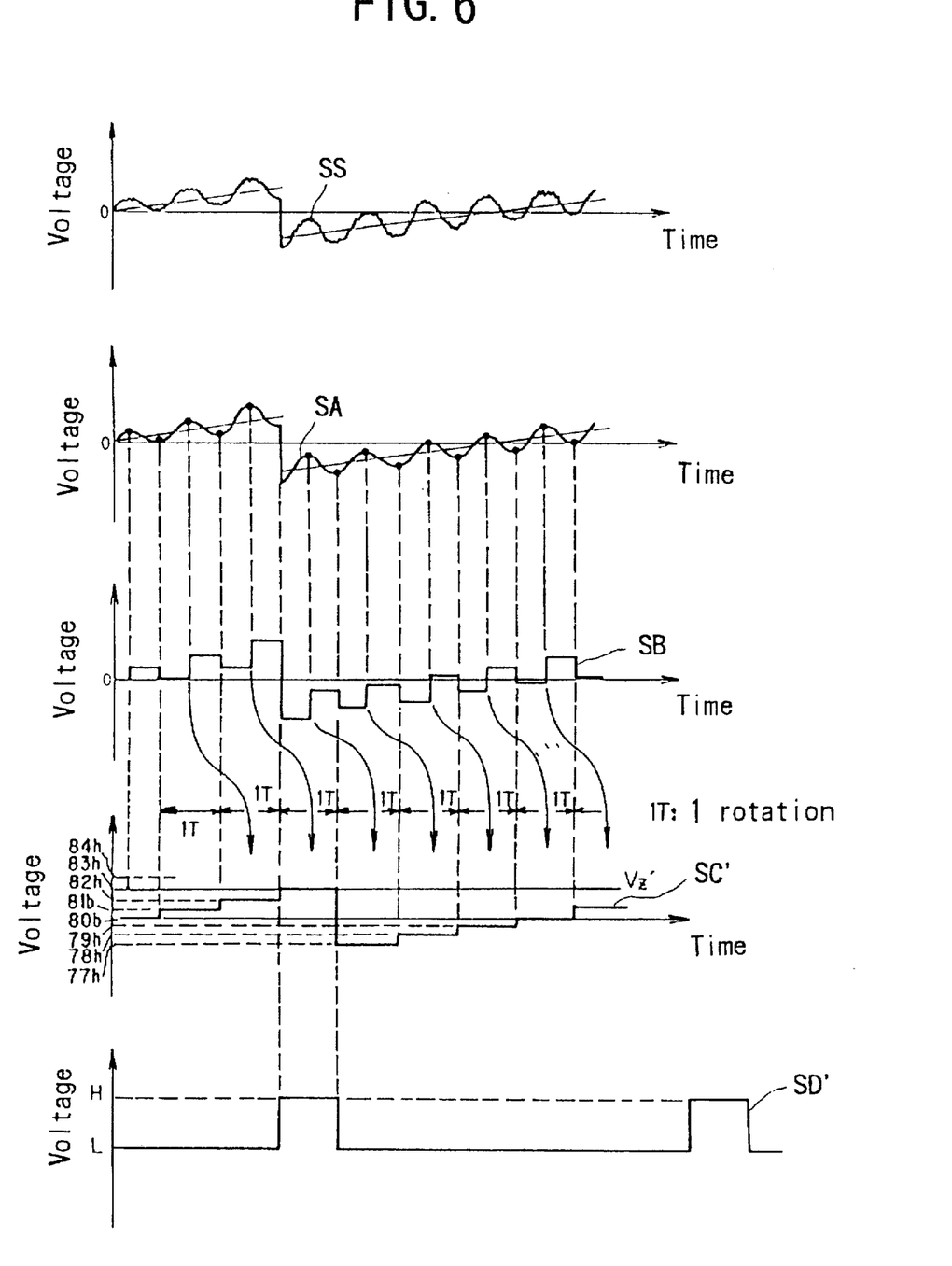
FIG. 6 is a wave form diagram showing wave forms of a shift quantity signal, a low frequency component signal, a sampling signal, an average signal and a driving timing signal in the second embodiment.

Here, for instance, the wave form and the characteristic of the shift quantity signal SS outputted from the lens shift sensor 40 are the same as those of the tracking error signal TE described in the first embodiment, as shown in FIG. 6.

The LPF 21 cuts off the high frequency noise NH from the shift quantity signal SS and outputs the low frequency component signal SA shown in FIG. 6 to the sampling device 26. On the other hand, while the aforementioned operation is being performed, the spindle motor 13 outputs the positive Hall element signal SH+ and the negative Hall element signal SH− to the first comparator 22. The first comparator 22 outputs the frequency generator signal FG. Then, the first frequency divider 23 outputs the first divided signal SN to the sampling device 26, and the second frequency divider 24 outputs the second divided signal SM to the average calculating device 41. Further, the sampling device 26 samples the low frequency component signal SA at the two sampling points and outputs the sampling signal SB to the average calculating device 41. The specific operations of the LPF 21, the first comparator 22, the first frequency device 23, the second frequency device 24, the sampling device 26 are explained in the first embodiment.

Next, the sampling signal SB outputted from the sampling device 26 is inputted to the average calculating device 41. Further, the second divided signal SM is also inputted to the average calculating device 41. The average calculating device 41 controls a sampling timing itself by using the second divided signal SM and generates the average of the sampling signal SB during the period of one rotation of the optical disk DK. Further, the average calculating device 41 decides the digital value which is the closest to the average of the sampling signal SB and outputs this digital value as the average signal SC' to the second comparator 42. In this manner, since the average calculating device 25 generates the average for each of one rotation of the optical disk DK, the eccentric noise (low frequency noise NL) is removed from the average signal SC', as shown in FIG. 6.

The second comparator 42 compares the digital value included in the average signal SC' with the digital value included in the reference signal Vz' outputted from the reference signal generator 43 and outputs the driving timing signal SD' to the driving pulse generator 44. In addition, the digital value included in the reference signal Vz' is decided on the basis of the moving range of the objective lens 1A of the pickup 1 and the range of the digital value included in the average signal SC', as shown in FIG. 6. For instance, the digital value included in the reference signal Vz' is 83h ("h" indicates a hexadecimal number). The amplitude of the driving timing signal SD' becomes high level when the digital value included in the average signal SC' exceeds the digital value included in the reference signal Vz', as shown in FIG. 6.

Figure 7:
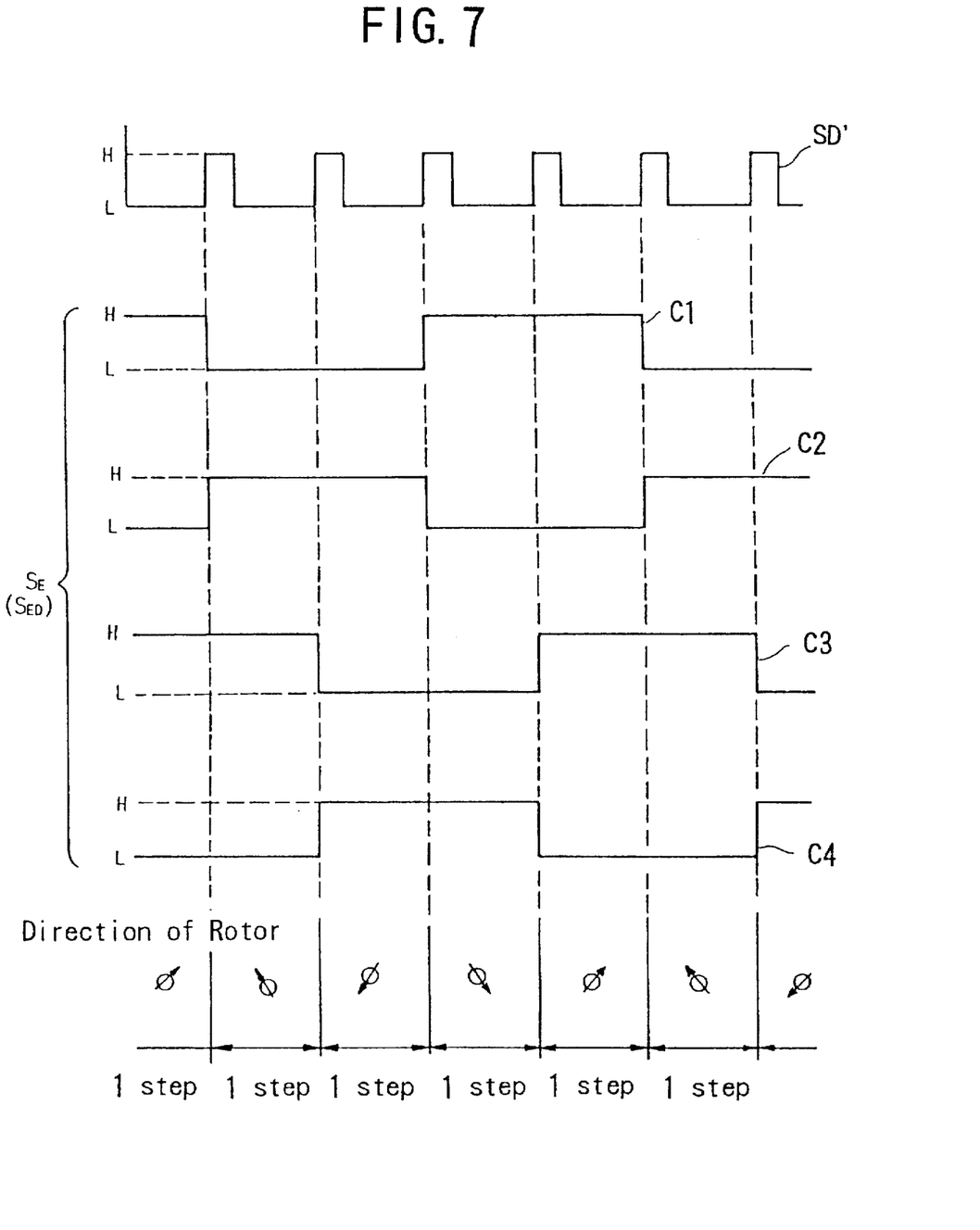
FIG. 7 is a timing chart showing a driving timing signal and a driving control signal in the second embodiment.
Figure 8:
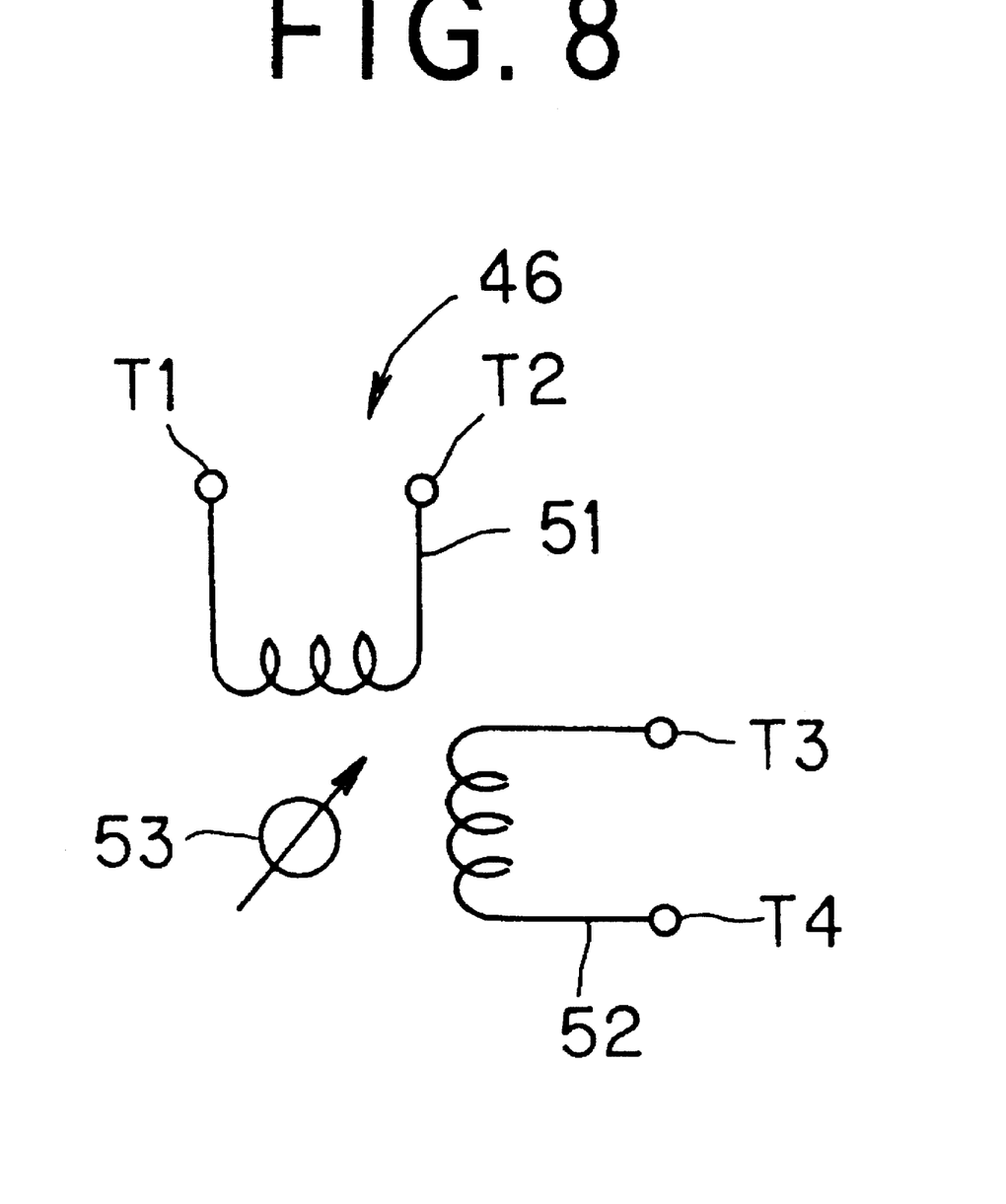
FIG. 8 is a diagram showing a construction of a stepping motor in the second embodiment.

The driving pulse generator 44 outputs the driving control signal SE to the motor driver 45. For instance, the driving control signal SE is constructed of currents C1 to C4 as shown in FIG. 7. As shown in FIG. 8, the stepping motor 46 has a rotor 53 connected with the shaft 12 and coils 51 and 52 each of which are magnetically connected with the rotor 53. Each of the currents C1 to C4 is applied to the coil 51 and 52. More specifically, in FIG. 7, a currents C1 and C2 are applied to a terminals T1 and T2 of the coil 51, a current C3 and C4 are applied to a terminals T3 and T4 of the coil 52. Each of the current C1 to C4 is respectively synchronized with the driving timing signal SD'.

Next, the motor driver 45 outputs the drive signal SED to the stepping motor 46. For instance, the drive signal SED, as well as the driving control signal SE, is constructed of the four currents. The wave forms of currents are respectively similar to the currents C1 to C4. Therefore, the rotor 53 of the stepping motor 46 rotates by one step on the basis of the drive signal SED. In addition, in case that one rotation of the rotor 53 is divided into 20 steps, the angle of the rotation by one step is 18 degree. Then, when the stepping motor 46 rotates, the shaft 12 rotates and the pickup 1 moves in the radial direction of the optical disk DK, i.e., the carriage servo control is carried out.

As mentioned above, according to the carriage and tracking servo control apparatus 200 of the second embodiment, the eccentric noise generated by the eccentricity of the optical disk DK is removed from the drive signal SED, and the control of the stepping motor 46 can be in stable, and thus, the control of the position of the pickup 1 can be in stable.

Especially, since the lens shift sensor 40 is disposed in the pickup 1, and the movement (shift) of the objective lens 1A is directly detected by the lens shift sensor 40, the detection of the shift of the objective lens 1A can be correctly done, so that the accuracy of the carriage servo control can be improved.

In addition, the tracks are discretely arranged on the optical disk DK, and the carriage and tracking servo control apparatus 200 controls the position of the pickup 1 on the basis of the position of the tracks discretely arranged. Therefore, in the carriage and tracking servo control apparatus 200, each of the signals are generated by the discrete signal process. Therefore, as the stepping motor is suitable for control by using a discrete value, it is preferable that the stepping motor is used for the carriage servo control of the carriage and tracking servo control apparatus 200.

Further, according to the aforementioned embodiments, the average of the sampling signal SB for each one rotation of the optical disk DK is generated. However, the present invention is not restricted to this. Namely, the average of the sampling signal SB for each two or more rotations of the optical disk DK may be generated.

Furthermore, the reference signal Vz (Vz') may be changed under the control of the micro-computer or the like. In this case, if the characteristic of the LPF 21 is fixed, the use of the carriage and tracking servo control apparatus 100 (200) can be expanded.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A position control apparatus comprising:
    a reading device for reading information from a track formed on a recording medium shaped in a disk by irradiating a light beam to said track, said reading device outputting said read information as an information signal;
    a first detecting means for detecting a quantity of a shift between a position of an irradiation of said light beam and a position of said track on the basis of said outputted information signal and generating a shift quantity signal corresponding to said detected quantity of the shift;
    a sampling means for sampling a low frequency component from said generated shift quantity signal;
    a calculating means for calculating an average of an amplitude of said sampled low frequency component during a period of one rotation or N (N is a natural number) rotations of said recording medium;
    a comparing means for comparing said calculated average with a predetermined value and generating a drive timing signal corresponding to a difference between said calculated average and said predetermined value;
    a generating means for generating a drive control signal to be used for controlling a movement of said reading device on the basis of said generated drive timing signal; and
    a first driving device for moving said reading device in a radial direction of said recording medium on the basis of said generated drive control signal.

2. A position control apparatus according to claim 1, wherein said reading device comprises:
    a condense device for condensing said light beam irradiated to said track;

a second driving device for moving said condense device in a radial direction of the recording medium; and a second detecting means for detecting a quantity of a movement of said condense device by said second driving device and outputting said quantity of the movement as said information signal.

3. A position control apparatus according to claim 2, wherein said condense device comprises an objective lens, and said second driving device comprises a tracking servo motor.

4. A position control apparatus according to claim 1, wherein said sampling means samples an, amplitude of said low frequency component at a moment corresponding to each of a plurality of sampling points set on said recording medium in advance.

5. A position control apparatus according to claim 4, wherein the number of said sampling points is two, and these two sampling points are disposed on said recording medium at the opposite sides of the center portion of said recording medium.

6. A position control apparatus according to claim 1, wherein said sampling means has a filter device for passing through said low frequency component of said outputted shift quantity signal and cutting off a high frequency component from said generated shift quantity signal.

7. A position control apparatus according to claim 1, further comprising a third detecting means for detecting a rotation number of said recording medium to be used for calculating said average of said amplitude of said sampled low frequency component during said period of one rotation or N rotations of said recording medium by said calculating means.

8. A position control apparatus according to claim 1, wherein said reading device comprises an optical pickup, and said first driving device comprises a carriage servo motor.

9. A position control apparatus according to claim 1, wherein said driving device comprises a stepping motor.

* * * * *